Patented Feb. 13, 1951

2,541,380

UNITED STATES PATENT OFFICE 2,541,380

SOLVENT EXTRACTION PROCESS

Orville L. Polly and Clyde H. O. Berg, Long Beach, Calif., assignors to Union Oil Company of California, Los Angeles, Calif., a corporation of California No Drawing. Application April 3, 1945,
Serial No. 586,454

4 Claims. (Cl. 183—115)

The present invention relates to the separation of gaseous hydrocarbon mixtures by means of liquid selective solvents, and relates particularly to separation of mixtures of hydrocarbons of approximately the same boiling point.

The separation of butadiene from a mixture containing butanes, butenes, and butadiene, for example, is difficult to accomplish by ordinary methods of distillation because there is only about 10° C. difference between the boiling points of the lowest-boiling and highest-boiling of these materials. Separation by solvent extraction, therefore, offers a powerful tool for segregation of such valuable materials as butadiene or butenes from butanes. It is an object of our invention to provide novel selective solvents and novel improvements in the latter type of process.

The solvent extraction processes of this invention may be applied to feed stocks consisting of mixtures of hydrocarbons having the same number of carbon atoms but having different degrees of unsaturation, for example, mixtures of members of a horizontal group in the following table:

| No. of Carbon Atoms | Degree of Unsaturation | | |
|---|---|---|---|
| | None (Paraffins) | One (Mono-olefins) | Two (Diolefins and acetylenes) |
| 2 | ethane | ethylene | acetylene. |
| 3 | propane | propylene | methyl acetylene. |
| 4 | butanes | butenes | butadiene. butynes. |
| 5 | pentanes | pentenes methyl butenes | pentadienes. isoprene. dimethyl acetylene, etc. |

However, the above definition must not be regarded as limiting the invention to these specific separations, for it is possible to separate by the process of this invention hydrocarbons of the same degree of unsaturation, such as 1-butene from 2-butene, for example, in which pair the 2-butene behaves as though it were more unsaturated than the 1-butene. Materials of three degrees of unsaturation, such as vinyl acetylene for example, and cyclic hydrocarbons such as cyclopropane, or cyclobutene, etc. may also be separated from other hydrocarbons of similar boiling point.

As an example of a solvent extraction process of this invention, gaseous feed is introduced into an extraction column (which may be packed with materials which provide improved contact, such as Raschig rings, plates, etc.) at a point near the middle of the column, while the selective solvent is introduced near the top of the column. The "raffinate" gas, which contains a larger proportion of the less unsaturated constituent than the feed stock, rises through the upper part of the column countercurrent to the flow of liquid solvent and leaves the column at the top while the "extract" gas, which contains a larger proportion of the more unsaturated constituent than the feed stock, is absorbed by the solvent and carried down to the bottom of the column and out. The solvent containing the extract gas is introduced into a distillation column, which may be equipped with a reboiler and reflux cooler, and by the usual process of fractional distillation, the extract gas is separated from the solvent in this column and leaves the column at the top. Part of the extract gas is returned to the base of the extraction column, and the remainder passes to storage. The bottoms from the distillation column are passed through a cooler, purified if necessary, and recirculated to the extraction column.

In a modification of the above process, the return of a portion of the extract gas is accomplished within the extraction column by the addition of heat at the base of the column so as to boil off a portion of the extract gas from the solvent. Although these processes are preferred, other modifications of the solvent extraction process in which the selective solvents of this invention may be employed are those of the "extractive distillation" type which has been described for example in U. S. Patent No. 1,948,777, or of other conventional types used in liquid extraction of gaseous mixtures.

As a specific example of an extraction carried out by the above preferred method, a mixture containing approximately equal parts by weight of normal butane and butadiene was fed at a rate of about 1.3 pounds per hour into the middle of a packed column about forty feet high and about three inches in diameter. A solvent consisting of an azeotropic mixture containing about 91% furfural and 9% water was fed to the top of the column at a rate of about 80 pounds per hour. The pressure on the column was maintained at about 20 lb. gage; the heater at the bottom of the column was maintained at a temperature about 180° F.; and the remainder of the column was operated at a temperature of about 100° F. The solvent containing extract gas was heated in a distillation column to separate the extract gas from the solvent, and the latter was recycled. Approximately equal volumes of raffinate and extract gases were obtained per hour from the top of the extraction column and the distillation respectively, and these gases contained approximately 2% butadiene and 99% butadiene respectively. The same process or the other modifications described above are applicable to separation of mixtures of butenes and butadiene, butanes and butenes, etc., or separation of other hydrocarbon mixtures as indicated previously, using the selective solvents of this invention.

The furfural water azeotrope used in the above process is a particular example of a preferred selective solvent according to our invention. The selectivity of this mixture as compared with that of 100% furfural is shown by the following data, which show what we shall call the "selectivity ratio" for the solvent, and define as the ratio of the volume of butadiene soluble at about 80° F. in the solvent to the volume of butane soluble under the same conditions.

| Solvent | Selectivity Ratio |
| --- | --- |
| 100% Furfural | 1.3 |
| Furfural-Water Azeotrope (Approx. 91% furfural) | 3.9 |

The beneficial effect of minor proportions of water on the selectivity ratio of selective solvents is further shown by the fact that a 90% methyl ethyl ketone-10% water azeotrope had a selectivity ratio of 1.9 while a 100% methyl ethyl ketone solvent had a selectivity ratio of only 1.2; and a dioxane-water azeotrope (20% water) had a selectivity ratio of 4.1 whereas pure dioxane had a selectivity ratio of 1.3.

It is an object of this invention to provide a number of selective solvents consisting of mixtures of more than one component, such as the above dioxane-water, which mixtures possess qualities of selectivity or operability superior to those of the major component. The azeotropes mentioned above, for example, are not only superior to the pure compounds in their selectivity, but have marked advantages in purification processes involving the use or presence of water, since the pure azeotrope is readily obtained on distillation of the mixtures. The azeotropes appear to be unique in their selectivity as compared with other mixtures containing slightly more or slightly less water. Solvents containing minor proportions of selectivity improving agents other than water are also included within the scope of this invention. Examples of such selectivity improving agents are polyhydric alcohols such as glycerine, ethylene glycol, diethylene glycol and other polyglycols, and the like; as well as low molecular weight amides such as formamide, acetamide, and other amides, preferably those containing less than about 5 carbon atoms. These may be used in place of water in the above selective solvents in any minor proportion in conjunction with selective solvents of the prior art or in conjunction with the novel selective solvents of the present invention as described below. For example, they may be used in place of water in the above furfural, dioxane, or methyl ethyl ketone solvents.

It is also an object of this invention to provide novel selective solvents for use in the extraction process of this invention, which solvents may be employed with or without, though preferably with, the above selectivity improving agents. Examples of these follow:

Nitroparaffins such as nitromethane, nitroethane, nitropropane, nitrobutane and the like are excellent selective solvents. Those are preferred which have less than about 5 carbon atoms, but cyclic saturated nitroparaffins, i. e., nitronaphthenes, such as nitrocyclohexane, nitrocyclobutane, nitrocyclopentane and the like may also be employed.

Mixtures of amines and phenols, which may be considered amine salts of the phenols are excellent solvents. The phenols may be phenol, cresols, xylenols, and the like. The amines may be methylamine, ethylamine, urea, ethylenediamine, or other amines preferably those containing less than about 5 carbon atoms. Examples are the urea salt of phenol, the methylamine salt of cresol, and the like. These salts may contain a slight excess of either the amine or the phenol, though approximately equimolal proportions are preferred; and minor proportions of water.

Diketones such as acetonyl acetone, 2,3-pentandione, 3,6-heptanedione, and the like are also excellent solvents, as are the unsaturated ketones whether acyclic such as methyloctenyl ketone, ethylhexenyl ketone, propylheptenyl ketone and the like, or cyclic unsaturated ketones such as isophorone, the cyclohexenyl ketones and the like. Acyclic saturated ketones having between about 4 and 7 carbon atoms are good solvents but are preferably used in conjunction with the selectivity improving agents shown above, since by themselves their selectivities are not as good as those of the above types. The above ketones, or aldehydes of similar composition, i. e., the carbonyl compounds of this invention are preferably those which will dissolve at least about 3% by weight of water at 20° C.

Solubility data for some of the 4 carbon atom hydrocarbons in several of the above solvents follows:

| Solvent | Solubility at 80° F. in ml. of gas per ml. liquid solvent | | | | | Selectivity Ratio |
| --- | --- | --- | --- | --- | --- | --- |
| | Butadiene | 2-butene | 1-butene | isobutene | n-butane | |
| Furfural | 39 | | | | 29 | 1.3 |
| 91% Furfural-9% H₂O [1] | 26 | 19 | 14 | 14 | 7 | 3.9 |
| Methyl Ethyl Ketone, H₂O [1] | 67 | | | | 36 | 1.9 |
| Acetonyl Acetone | 38 | | | | 11 | 3.4 |
| Nitromethane | 33 | | | | 7 | 4.7 |
| Nitropropane | 70 | | | | 25 | 2.8 |

[1] Azeotropic mixture.

In general, gases showing appreciable differences in solubility in the selective solvent may be separated by the processes of this invention, the ease and completeness of the separation increasing with increasing differences in solubility, the more soluble gas being concentrated in the extract phase.

Many modifications may be applied to the processes described above. For example, the extraction equipment may be fitted with heaters or coolers to provide for extraction at any temperature between the approximate condensation point of the gaseous feed stock, and the boiling point of the selective solvent, under the conditions of use. Pressures may vary correspondingly. Flow rates may be varied over wide limits. A temperature gradient may be maintained if desired through the extraction column, in which case the temperature should increase in the direction of flow of the extract gas. Absorbers may be provided to purify the raffinate and extract gases of residual traces of solvent. In case the composition of the selective solvent is altered in the process of removing the extract gas from it, it may be adjusted by purification or addition of the required component. The distillation of the extract phase may be conducted in the presence of steam, pressure, or vacuum. Other modifications in methods and solvents obviously may be made which will fall within the scope of the following claims.

This is a continuation-in-part of our copending application, Serial No. 449,194, filed June 30, 1942, now abandoned.

We claim:

1. A process for separating one gaseous monoolefin from another gaseous monoolefin having the same number of carbon atoms which comprises contacting said mixture with a diketone and thereby selectively dissolving one of said monoolefins.

2. A process according to claim 1 in which the diketone is acetonyl acetone.

3. A process according to claim 1 in which the diketone is acetonyl acetone and the two monoolefins are 2-butene and 1-butene.

4. A process according to claim 1 in which 2-butene is selectively dissolved and separated from 1-butene.

ORVILLE L. POLLY.
CLYDE H. O. BERG.

REFERENCES CITED

The following references are of record in the file of this patent:

UNITED STATES PATENTS

| Number | Name | Date |
|---|---|---|
| 2,153,115 | Burk | Apr. 4, 1939 |
| 2,290,636 | Deanesly | July 21, 1942 |
| 2,356,986 | Frey | Aug. 29, 1944 |
| 2,366,360 | Semon | Jan. 2, 1945 |
| 2,371,908 | Morris | Mar. 20, 1945 |
| 2,374,984 | Evans et al. | May 1, 1945 |
| 2,375,036 | Pierotti | May 1, 1945 |
| 2,379,696 | Evans | July 3, 1945 |

OTHER REFERENCES

Extraction of 1,3-Butadiene from Cracked Gases.

Comparative Solubilities of 1,3-Butadiene and Butenes, Moor et al.; U. O. P. Co. Translation S-153, Feb. 6, 1942, pages 1-7.